United States Patent [19]

Schonlau et al.

[11] Patent Number: 5,121,686
[45] Date of Patent: Jun. 16, 1992

[54] PISTON-CYLINDER ASSEMBLY OF PLASTIC MATERIAL

[75] Inventors: Juergen Schonlau, Walluf; Alfred Birkenbach, Hattersheim; Ralf Harth; Wolfgang Ritter, both of Oberursel/Ts., all of Fed. Rep. of Germany

[73] Assignee: Alfred Teves GmbH, Frankfurt am Main, Fed. Rep. of Germany

[21] Appl. No.: 455,363

[22] PCT Filed: Apr. 24, 1989

[86] PCT No.: PCT/EP89/00443
§ 371 Date: Jan. 9, 1990
§ 102(e) Date: Jan. 9, 1990

[87] PCT Pub. No.: WO89/11600
PCT Pub. Date: Nov. 30, 1989

[30] Foreign Application Priority Data

May 16, 1988 [DE] Fed. Rep. of Germany ....... 3816607
May 16, 1988 [DE] Fed. Rep. of Germany ....... 3816609
May 16, 1988 [DE] Fed. Rep. of Germany ....... 3816610

[51] Int. Cl.⁵ .................. F01B 31/00; B60T 11/26
[52] U.S. Cl. ........................ 92/163; 92/248; 60/588
[58] Field of Search ............ 92/169.1, 170.1, 171.1, 92/248; 60/533, 562, 586, 588; 285/382.4, 382.5, 222; 29/510

[56] References Cited

U.S. PATENT DOCUMENTS

| 1,967,664 | 7/1934 | Dick | 60/588 |
|---|---|---|---|
| 2,160,075 | 5/1939 | Brie | 60/588 X |
| 3,703,125 | 11/1972 | Pauliukonis | 92/170.1 X |
| 4,414,811 | 11/1983 | Gaiser | 60/562 X |
| 4,455,830 | 6/1984 | Gaiser et al. | 60/588 X |
| 4,510,752 | 4/1985 | Gaiser | 60/562 |
| 4,527,395 | 7/1985 | Gaiser et al. | 60/562 |
| 4,671,065 | 6/1987 | Ishiwata | 92/170.1 X |
| 4,685,300 | 8/1987 | Steer | 60/562 |
| 4,831,916 | 5/1989 | Leigh-Monstevens et al. | 92/248 X |
| 4,989,498 | 2/1991 | Mori et al. | 92/169.1 X |

Primary Examiner—Edward K. Look
Assistant Examiner—John Ryznic
Attorney, Agent, or Firm—Robert P. Seitter; J. Gordon Lewis

[57] ABSTRACT

A clutch master assembly made of plastic material for an automotive vehicle. The assembly a plastic cylinder housing (1) and a piston (2) and a plastic bushing (3). The plastic bushing is arranged to allow it to be screwed in by means of a thread portion (4) which is located in the housing. By the screwing-in of the bushing a grooved disc (5) and a grooved cup (6) are secured in the assembly. The grooved cup is furnished with knobs (21, 22, 23) which exert a force in axial direction on the arrangement consisting of the grooved cup (6) and the grooved disc (5). The piston-side enlarged end of the piston rod (31, 104) is secured within the piston (2, 103) by a back injection.

10 Claims, 4 Drawing Sheets

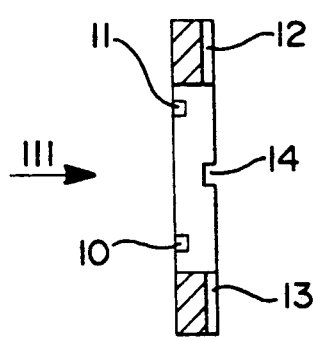
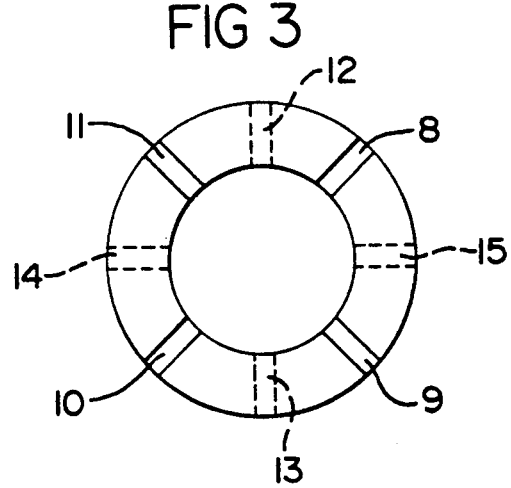
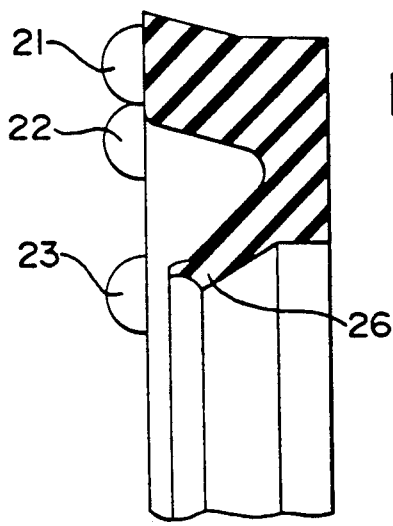
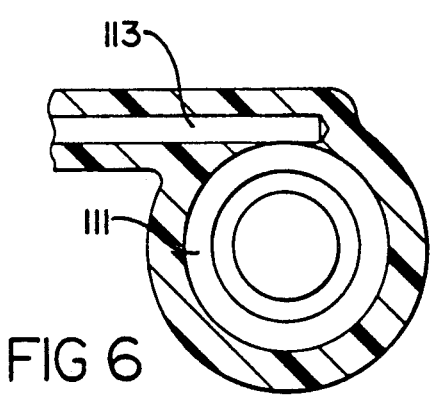
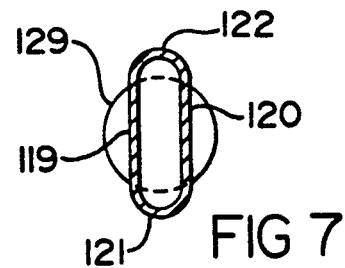

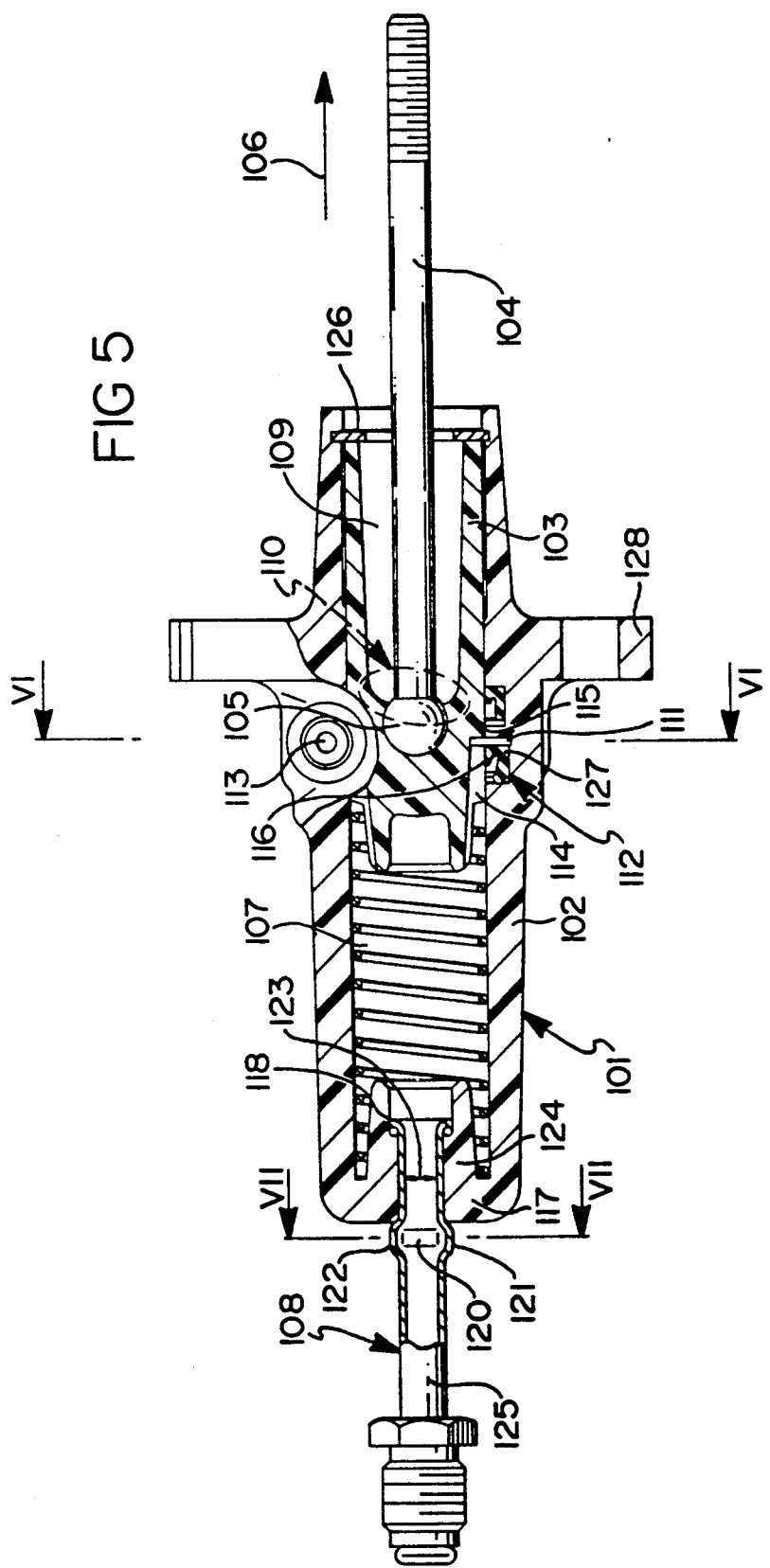

PISTON-CYLINDER ASSEMBLY OF PLASTIC MATERIAL

BACKGROUND OF THE INVENTION

This invention relates to a piston-cylinder assembly of plastic material, of glass fibre reinforced plastic, for a master assembly for hydraulic systems in automotive vehicles, and to a process and an apparatus for its manufacture.

In the published German patent application No. 3149628.8, a ball-and-socket joint connection is described between a push rod furnished with a ball head and a pressure element, between the push rod and a piston of a hydraulic brake power booster or master cylinder. The push rod is swingably inserted in a base bore of the piston and a retaining element which simultaneously serves as a reinforcing element and partly surrounds the ball head being arranged between the base bore and the ball head. It is proposed in the patent application that the retaining element is provided with a plurality of elastic projections some of which are formed with offsets which back-grip the ball, whereas the others abut with an initial stress against the wall of the base bore.

In International Patent Application No. WO 87/03344 (PCT application) a cylinder is disclosed which is applied in a hydraulic system. The cylinder is composed of two parts. Each part is made of plastic material. One part comprises an external shell which presents an opening. An end wall is provided at the opposite end. The other part comprises an internal bushing. The bushing is precision-fitted within the shell. It extends from the forementioned open end to the forementioned end wall. The end of the forementioned bushing which is disposed distant from the open end is located at a distance from the end wall. A cylindrical bore is provided in the bushing. A piston is slidingly arranged within the bore. The piston can move in the direction of the end wall and away from the end wall.

Sealing means are provided which abut against the circumference of the piston. The sealing means are retained between the internal end of the bushing and the opposite surface of the shell. A pressure chamber is arranged between the end wall and the piston.

Furthermore, a hydraulic master cylinder is described in the British patent application No. GB 2071797A which comprises a cylinder and a supply tank manufactured separately. The supply tank is fastened on the cylinder. The supply tank and the cylinder are interconnected in such a manner that hydraulic fluid may flow between the supply tank and the cylinder during operation. The supply tank has projecting arms which are in abutment against the outside cylinder wall, against opposite sides of the cylinder. These arms serve to keep the supply tank and the cylinder together, so that they can be put into operation jointly. The supply tank is made of plastic material.

Known piston-cylinder assemblies have a complicated set-up which is unsuitable for mass production. In many cases, metal supporting or reinforcing elements are required, since the plastic bodies alone are not capable of absorbing the mechanical forces. In addition, the known assemblies require expensive mechanical machining.

Accordingly, the invention has the following objects: In piston-cylinder assemblies, particularly in clutch master assemblies, the sealing cup which serves to seal the piston within the cylinder frequently is passed over uncontrollably. In many cases, the reason is that the cup has an axial play. It is one of the objects of the invention to achieve a positioning of the cup without such axial play. It has been proposed to provide springs and sheet metal elements to exert an axial pressure on the cup and, thus, to contribute to the positioning of the cup. The combination of plastic material elements and sheet metal elements is unfavorable because this leads to malfunctioning and reduces the service life of the piston-cylinder assembly. In addition, such a combination is expensive, in particular for mass production, and does not allow automation with regard to the manufacture and to mounting. Therefore, it is another object of the present invention to render such sheet metal elements and springs superfluous. Furthermore, the other metal components, such as retaining metal sheets, cup elements, etc. which are to reinforce and support, which are utilized in the known assemblies are avoided.

It is, moreover, an object of the present invention to use phenolic resin plastic as a material to construct a piston-cylinder assembly.

In addition, fewer components than in known devices are utilized for the set-up of the piston-cylinder assembly. The costs of manufacture thereof are reduced. Further, the invention should provide the possibility of connecting the cylinder of the assembly, if it is mounted in the passenger compartment, to the hydraulic system from the engine compartment.

Glass fibre reinforced plastic is machined only with difficulty. It is not weldable. These inconveniences which are due to the material are avoided by the present invention. In particular, the invention safely absorbs the forces caused by the high pressure in the cylinder through a plastic material thread. Manufacture and mounting of the entire piston-cylinder assembly are easily accomplished. In particular, favorable conditions are created for a mechanical and automated mass production.

The cutting or machining operations which were necessary in known piston-cylinder assemblies are reduced considerably by the present invention. The breather bore of known master cylinder assemblies are avoided. In the known devices, the breather bore represents a problematic detail which leads to heavy wear of the cups in the piston-cylinder assembly. The known master cylinders comprise numerous components which require in many cases machining in a highly expensive manner. The present invention has the further object to considerably reduce the number of components required.

The manufacture of the master cylinder should involve lower costs than known devices. The inventive master cylinder provides a design which offers ease of mounting and is, in particular, suitable for a low-cost mass production. The present invention provides conditions for a mechanical final mounting of the assembly in its entirety.

Duroplast material is applied at an increasing extent as a material for the manufacture of plastic cylinders. In many cases, duroplast is reinforced with glass fibres. Mechanical machining of duroplast, in particular if it is reinforced with glass fibres, is expensive and difficult. The service lives of the tools are in part unreasonably short. Consequently, it is another object of the present invention to provide processes and apparatus for the realization of the processes which either avoid any mechanical machining or reduce machining to a significant extent.

In accordance with the present invention, these prerequisites are fulfilled in that the plastic components of the master assembly do not require any supporting or reinforcing metal elements as is the case of known plastic cylinders. Among others, it is an object of the invention to utilize the duroplast piston material by itself, that is, without metal auxiliary means for securing the ball-shaped head of the piston rod in the piston. This means that no clips and springs are necessary as is the case in known devices to connect the piston rod to the piston. In this regard, such metal elements cannot be used in combination with duroplast as duroplast is to brittle.

Strict observance of the dimensions of the inside contours of the housings of cylinders which are made of plastic material is problematic in the known devices. This applies, in particular, if and when the housings are manufactured by plastic injection molding processes in mass production. It is an object of the present invention to achieve a higher dimensional accuracy of the inside contours of the housings. It is a further object of the present invention to improve and to reduce the cost of mass production of plastic cylinders, in particular of plastic master cylinders for the automotive vehicle technology, while simultaneously maintaining an elevated dimensional accuracy of the inside contours. Moreover, conditions are provided by the present invention which render it possible to manufacture the entire cylinder housing in mass production in its final shape with dimensionally accurate inside contours substantially by plastic injection molding alone. Any cutting or machining is, for example, avoided.

It is another object of the present invention that bosses, burrs, in particular mold division burrs which come about when two-part tools are used do not introduce problems in the event of subsequent assembly of the cylinder or impair the functions of the cylinder. As an alternative, the present invention provides that in the course of the manufacturing process such bosses, burrs, etc. are eliminated, and, particularly, sheared off.

SUMMARY OF THE INVENTION

According to the invention, these and other objects are achieved in that a hollow cylinder (bushing) made of plastic material is provided as a guide for the plastic piston which is arranged in the plastic cylinder housing to allow its being screwed in by means of a thread originated in the course of the manufacturing procedure of the housing and which in the mounted condition exerts an axial pressure on a coaxially disposed disc and a coaxially disposed cup. A particularly compact and, thus, space-saving design results in that the disc is furnished with radially disposed hydraulic fluid ducts, in particular in the shape of grooves (grooved disc). For this purpose, in the range of the disc the hollow cylinder and the housing of the assembly form an annular duct which connects the radial ducts of the disc to the hydraulic fluid influx duct connected to the hydraulic fluid supply tank.

In a preferred embodiment, in the range of its end projecting into the pressure chamber, the piston is formed with a projection which in its preferably slightly conically shaped generated surface presents at least one longitudinal groove which establishes a hydraulic connection between the radial ducts and the pressure connection between the radial ducts and the pressure chamber in the retracted position of the piston. In a simplified but favorable embodiment the cup is arranged as a valve permitting the intake of hydraulic fluid through the longitudinal grooves when the piston is being retracted and establishing a hydraulic seal between the piston and the housing when the piston is advancing.

The disadvantageous prior-art springs and metal elements advantageously are avoided by the present invention in that the cup is provided with axially arranged knobs which serve as elastic elements and which keep the cup-and-disc arrangement under axial pressure when the hollow cylinder is screwed into the housing. It is, furthermore, provided that the cup is furnished with a sealing lip which exercises the valve function. Still further any particular means of reinforcement to form a stop for the piston are unnecessary because at its pedal-side end, the hollow cylinder can be provided with a molded, particularly radially inwardly extending stop for the piston.

For the purpose of simplification and cost reduction for the manufacture of the piston-cylinder assembly, the hollow cylinder can be arranged so as to be screwable into the housing of the assembly by means of a thread which is provided during the manufacturing process by the spindling-out of tool.

In those cases in which the master cylinder is mounted in the passenger compartment a pressure nozzle may be arranged as a piece of pipe which connects the assembly with the hydraulic fluid line leading to the other components of the hydraulic system. This arrangement may then be provided in an opening in the splash shield of the engine compartment and furnished with a flange-type screw fitting such that the cylinder of the assembly is connectible from the engine compartment. Another advantageous embodiment of the present invention is distinguished by the fact that the piston-side, radially enlarged end of the piston rod is secured within the plastic material piston by a back injection, preferably by a back taper or back gripping.

As a significant improvement over known devices, in its range disposed distant from the pressure chamber, the primary groove for the primary cup is furnished with an annular duct arranged in the cylinder housing, preferably with a recess, and preferably through a duct located in the cylinder, the annular duct is in hydraulic connection with the supply tank for the hydraulic fluid.

A particularly low-cost mounting of the piston-cylinder assembly is achieved in that the hydraulic fluid outlet which represents the hydraulic link between the pressure chamber of the assembly and the other components of the hydraulic system is formed by a pipe which is flared in the range of its pressure chamberside end as is provided, in the range of its exit from the cylinder in radial direction, with at least one pinching in radial direction leading to at least one bulging in the unpinched range of the circumference of the pipe. The pinching is made in the event of mounting of the pipe within the cylinder, wherein the flaring together with the bulging provide means for fixing the pipe within the cylinder.

Another low-cost manufacture is attained by the present invention wherein the cutting or machining operations are reduced to a considerable extent. The conventional breather bore is eliminated. The master cylinder in accordance with the present invention provides ease of mounting, as the housing and the piston each comprise but one part at the moment of final mounting. Supporting sheet metal elements are avoided. Therefore, the present invention provides that duroplast becomes applicable to master cylinders. Duroplast is a phenolic resin plastic material that withstands the elevated temperatures in the engine compartment where the master cylinder is accommodated. No clips and spring as according to long-accepted teachings of the prior art are required to retain the ball-shaped head of the piston rod of the present invention.

With regard to the process taught by the present invention, the objects proposed are, moreover, achieved in that upon the injection procedure, a first tool is spindled out of the cylinder housing by means of a thread and subsequently a second tool is extracted from the cylinder housing. For the application of the process for the manufacture of a housing which comprising a cylindrical chamber having a plurality of diameters, in particular of a stepped cylindrical chamber, it is taught herein that the first tool is spindled out of the range of the chamber having the larger diameter, that subsequently the second tool is extracted from the range of the chamber having the smaller diameter. A further improvement of the process according to the present invention consists in that bosses, burrs, etc. which are due to the manufacture, in particular mold division burrs, are sheared off in the event of extraction of the second tool. For the purpose of carrying out the process, an apparatus is provided which is distinguished in that a first tool furnished with a thread is provided which is arranged so as to allow spindling out of the cylinder housing, wherein a second tool is provided which is arranged to allow extraction from the cylinder housing.

For the realization of a process for the manufacture of a housing comprising a cylindrical chamber having a plurality of diameters, in particular of a stepped cylindrical chamber, a first tool is furnished with a thread which presents a diameter corresponding to the larger diameter of the cylinder and which is arranged to allow spindling out of the cylinder. A second tool is provided which presents a diameter corresponding to the smaller diameter of the cylinder and which is arranged to be extractable from the cylinder. As a further feature of the present invention, the first tool is provided in the shape of a bushing, the second tool is arranged in the shape of a piston which is arranged within the bushing at least partly during the manufacturing process.

According to still other features of the invention, a housing for a cylinder is provided which is manufactured by the described processes and/or apparatus and in which it is provided that the wall of the cylinder surrounded by the housing is furnished with a thread fabricated by spindling-out the tool. The thread serves as a fixing means, in particular as a means for screwing in further components of the cylinder in the course of the assembly thereof. Finally, an injection molding process is provided for the manufacture of the piston-cylinder assembly according to which the piston rod and a core surrounding the piston rod are arranged. The assembly is arranged in a first process step, in an injection die mold corresponding to the external shape of the piston, in a second process step the unit comprised of the piston rod and the core is embedded by injection of plastic material, and in a third process step the core is removed. In a further embodiment of the process in accordance with the present invention, that piston-side end of the piston rod which is enlarged in radial direction is embedded by injected plastic material in such a manner that under formation of a back taper or back gripping a certain force of extraction is transmitted to the piston by the piston rod.

BRIEF DESCRIPTION OF THE DRAWING

These and other details of the present invention will be described in greater detail in the following description of two embodiments of the invention taken in conjunction with the accompanying drawing, in which:

FIG. 2 shows a cross section of a grooved disc in axial direction;

FIG. 3 shows a view of the grooved disc according to FIG. 2 in the direction of the arrow III in FIG. 2;

FIG. 4 shows the profile of a grooved cup;

FIG. 5 is a cross sectional representation of another design of the piston-cylinder assembly, the cross section running through the axis of the assembly;

FIG. 6 is a cross sectional representation along the sectional line II—II in FIG. 5;

FIG. 7 is a cross sectional representation along the sectional line III—III in FIG. 5; and, FIG. 8 is a diagrammatic representation of the apparatus to carry out the process according to the invention.

DETAILED DESCRIPTION

Figure 1:
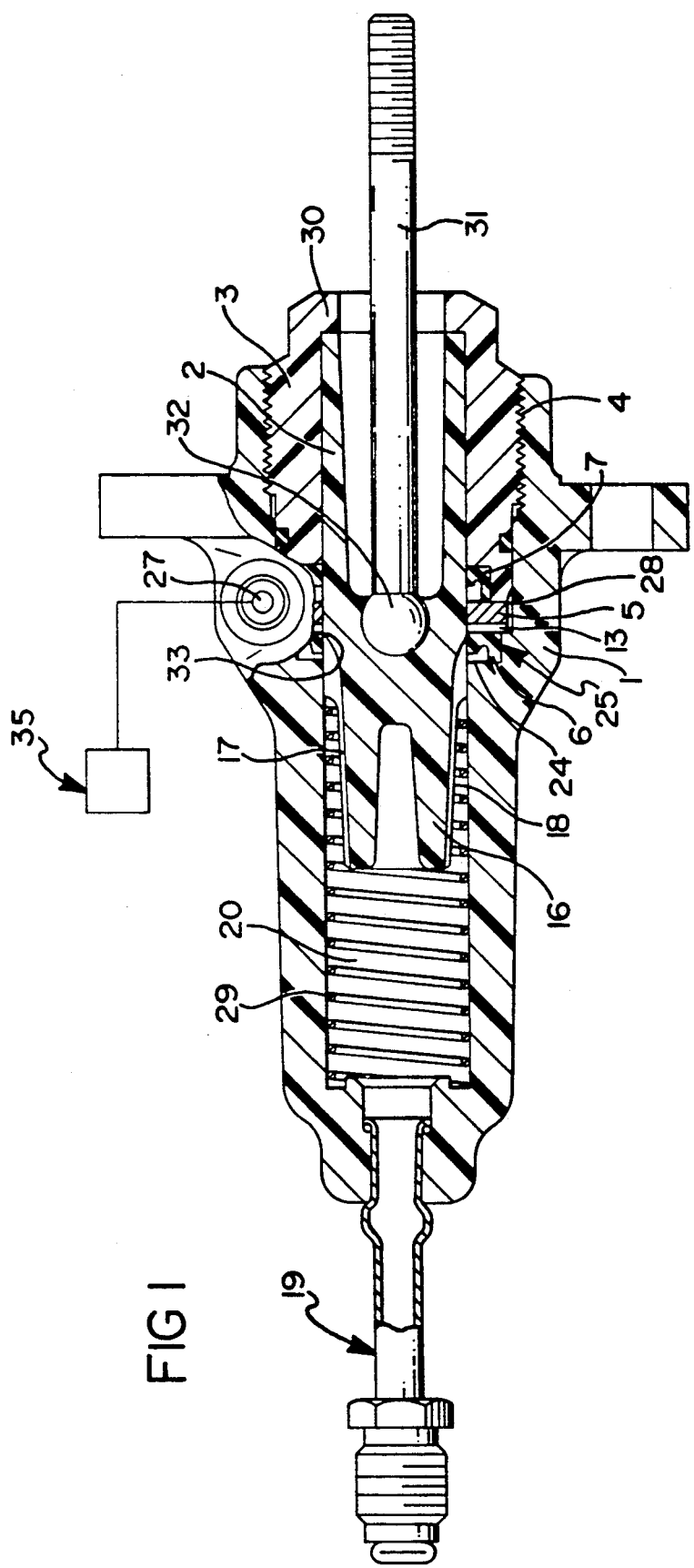
FIG. 1 shows a cross section of the piston-cylinder assembly in axial direction.

In FIG. 1, a piston-cylinder assembly of plastic material is shown which provides a master assembly for a hydraulic clutch actuating system in an automotive vehicle. Reference numeral 1 denotes the plastic housing. The piston bears the reference numeral 2. The bushing 3 is screwed into the housing 1 by means of a threaded portion or thread 4. The thread originates from and is provided during the manufacturing process (plastic injection molding process). The bushing guides the piston and retains the grooved disc 5 and the grooved cup 6 in their positions shown in FIG. 1. Reference numeral 7 denotes a further sealing cup. The screwed-in bushing safely secures the arrangement comprising the grooved cup and of the grooved disc. Details of the grooved disc are best illustrated in FIGS. 2 and 3. These Figures reveal the radially arranged ducts 8, 9, 10, 11, 12, 13, 14, 15 or grooves. The radially arranged groove 13 additionally is shown in FIG. 1.

The piston 2 is furnished with a pressure chamberside projection 16 provided with longitudinal grooves 17, 18. At the left end of the housing 1 as shown in FIG. 1, a pressure nozzle 19 is located which connects the pressure chamber 20 with a hydraulic fluid line. The hydraulic fluid line leads to the slave cylinder of the hydraulic clutch.

The particular profile of the grooved cup 6 is illustrated in FIG. 4. In FIG. 4, reference numerals 21, 22, 23 denote knobs which extend in axial direction and which are in abutment against the radial wall 24 of the step 25 as is illustrated in FIG. 1. The knobs function as spring elements which keep the arrangement of the grooved cup and of the grooved disc tensioned when the bushing is in the screwed-in position. Due to the foregoing and due to the screwed-in bushing 3, a positioning without play of the grooved cup and the grooved disc is provided. Reference numeral 26 in FIG. 4 denotes a sealing lip which provides a valve function as will be explained more fully hereinafter. The sealing lip 26 is arranged juxtaposed to the generated surface of the piston, while the knobs are positioned in the range of the radially outside surface of the step 25.

In the situation illustrated in FIG. 1, hydraulic fluid may flow from the hydraulic fluid supply tank 35 through the duct 27 into the annular chamber or annular duct 28. This annular duct is formed by the bushing 3, the cylinder housing 1 and the grooved disc 5. The hydraulic fluid contained in the annular duct may reach the longitudinal grooves 17, 18 through the radial ducts 8 to 15. From the longitudinal grooves 17, 18, the hydraulic fluid flows into the pressure chamber 20. In that situation as illustrated in FIG. 1, the piston is retracted to the right, and due to the pressure exerted by the spring 29 it is in abutment against the stop 30 being molded at the bushing 3. Upon actuation of the clutch pedal, the piston 2 is moved to the left due to the action of the push rod 31 which is swingably embedded by injection within the phenolic resin plastic piston 2 and which presents a ball 32 suitably coated with grease. The edge 33 of the piston passes over the sealing lip 26. As a consequence, the connections between the radial ducts 8 to 15, on one hand, and the pressure chamber 20, on the other hand, are interrupted. Pressure will build up within the pressure chamber 20. The sealing lip 26 comes into abutment against the external generated surface of the piston. The grooved cup with its sealing lip now assumes the closing function as a valve.

In FIG. 5, a plastic clutch master cylinder 101 of an automotive vehicle is illustrated which is furnished with a plastic housing 102. Within the housing, the piston 103 made of plastic is guided to be moved by a clutch pedal (not shown). The force of the clutch pedal is transmitted to piston 103 through the piston rod 104. At its lefthand end piston rod 104 presents a ball-shaped head 105 which is embedded in plastic by injection so that a force of extraction in the direction of the arrow 106 is transmitted to the piston 103 by the piston rod 104. Reference numeral 107 denotes the pressure chamber. The hydraulic fluid outlet is shown generally at reference numeral 108.

The manufacture of the clutch assembly according to FIG. 5 takes place in a plurality of steps. The piston rod and a core are accommodated in an injection die mold corresponding to the external shape of the piston. The core occupies the range of the annular chamber 109 arranged to surround the lefthand part of the piston rod. The piston rod and the core are embedded in plastic by injection. Subsequently the core is removed. A back injection, respectively a back taper or back gripping of the ball head 105 is obtained in this manner in the range 110. Back taper represents a safe connection between the piston rod and the piston. This connection is made sufficiently sturdy as to permit the transmission of a force of extraction of, for example, 100 kg. It will be appreciated by those skilled in the art that the master assembly in accordance with the present invention does not require any additional securing and supporting metal elements such as are utilized in prior art for fixing of the piston rod within the plastic piston.

Reference numeral 111 denotes a recess in the housing 102. Recess 111 is disposed in a range of the bottom of the primary groove 112 for the primary cup 127 which is disposed distant from the pressure chamber 107. The recess 111 assumes the function of the conventional breather bore. In the pressureless condition the hydraulic fluid flows through the duct 113 (see also FIG. 6) which establishes the connection to the hydraulic fluid supply tank (not shown), through the recess 111 and through the clearances 114 arranged radially outside at the lefthand end of the piston 103 forth into the chamber 109. When the clutch pedal is actuated, the piston 103 will be translated to the left by the piston rod 104. The edge 115 will pass over and close the recess 111. When the piston 103 is moved further to the left, the edge 115 will pass over the sealing lip 116 of the primary cup 127. The sealing lip 116 will sealingly be pressed against the generated surface of the piston 103 by the pressure building up in the pressure chamber 107. Hydraulic fluid will be conveyed through the outlet 108 to the slave cylinder of the hydraulic clutch actuating system. The position and the configuration of recess 111 as well as its connection to the duct 113 are best illustrated in FIG. 6

The hydraulic fluid outlet 108, see FIGS. 5 and 7, is formed by a pipe which is accommodated in the wall 117 of the cylinder 102. The pipe is provided with a flared end 118. Relative to the wall, two pinchings are made which are opposed to the flared end 118. The position of the pinching 119, 120 is illustrated in FIG. 7. These pinchings cause bulgings 121, 122 which radially surmount the diameter 123 of the opening 124 in the wall 117. The bulgings 121, 122 jointly with the flared pipe end 118 fix the pipe 125 in the wall 117 of the cylinder. The original generatrix of the pipe, that is, the generatrix existing before the pinching operation and which at that time is perfectly circular is shown by a dashed line in FIG. 7 and bears reference numeral 129. For the purpose of mounting of the pipe 125, the pipe is inserted with its flaring 118 into the opening 124 from the inside. Subsequently, the pinching is made on the outside.

Reference numeral 126 denotes a Seeger circlip securing the piston within the cylinder housing. The flange 128 is connected to the pedal block. The position of the splash shield of the vehicle may be to the left of the flange, see FIG. 5, as the automotive vehicle manufacturer may require. This is of advantage, as the automotive vehicle manufacturer is free to position the splash shield as desired.

Figure 8:
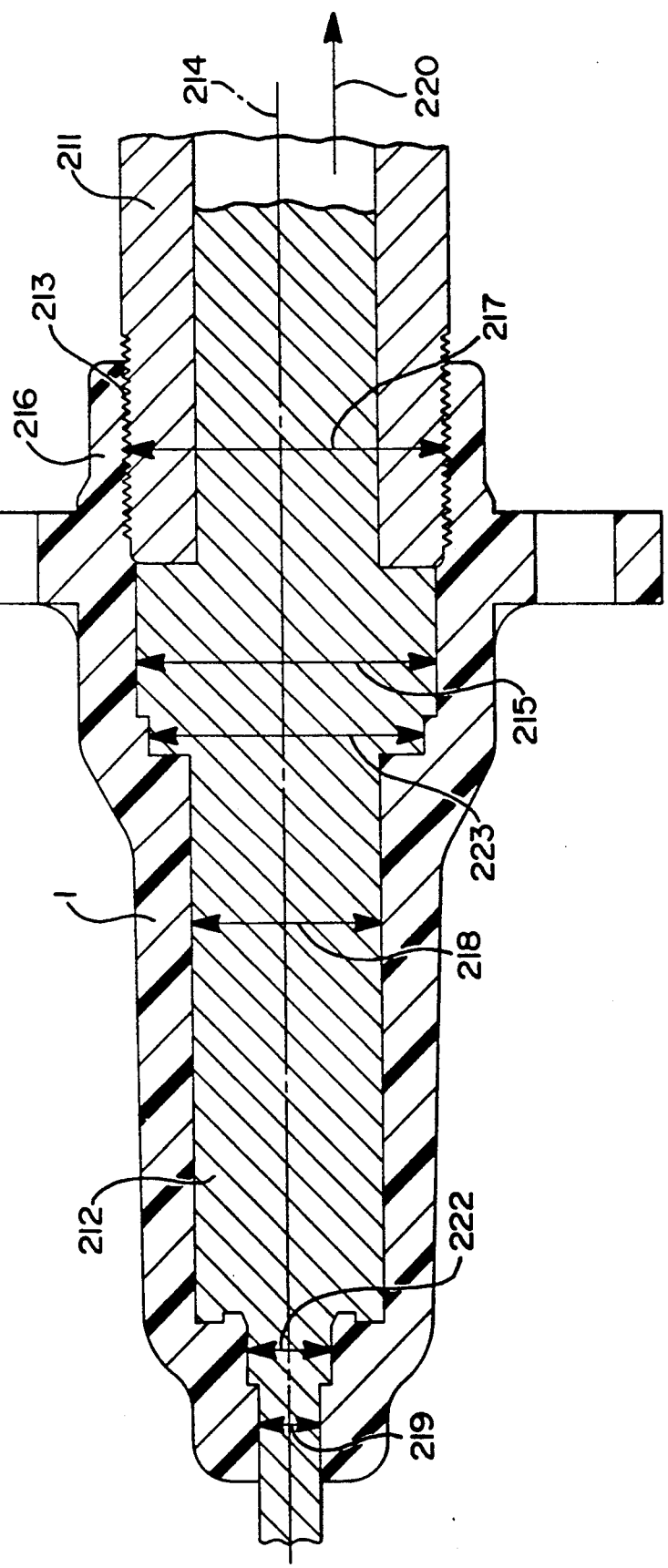

Finally, in FIG. 8 a first tool bears reference numeral 211 and a second tool reference numeral 212. The first tool has a bushing-shaped configuration and is furnished with a thread 213 on its surface.

The second tool 212 has a piston-shaped configuration and is arranged partly within the bushing-shaped tool 211 in FIG. 8. For clarity, the first tool 211 is illustrated in FIG. 8 hatched from top left to bottom right, in an axial cross section. In its axial sectional view, the second tool 212 is illustrated with a hatching from bottom left to top right. The axis of the two tools is marked by the dash-dotted line 214.

Manufacture of the cylinder housing takes place in the following process steps: First of all, plastic is injected in the mold for the housing, during which procedure the first and the second tool are embedded in plastic. Subsequently, the first tool is spindled out, that means, the first tool 211 is screwed out of the range 216 of the housing 1 by the thread 213. In the next process step the piston-shaped second tool 212 is extracted from the housing 1 to the right, in the direction of the arrow 220. A mold division burr may form in the range of the surface of the inside wall of the housing, which is sheared off in the course of extraction of the second tool 212. After the first tool 211 has been spindled out, the housing 1 presents a thread 213. This thread may be utilized to screw in, for example, the component 3 (FIG. 1) to assemble the master cylinder.

As is illustrated in FIG. 8, the processes and apparatus according to the present invention allow manufacture of cylinder housings which have a stepped configuration. In FIG. 8, six diameters 217, 215, 223, 218, 222, 219 are illustrated in this regard.

What is claimed is:

1. A piston-cylinder assembly of plastic material, for a hydraulic system for an automotive vehicle, comprising: a plastic cylinder housing having a stepped bore formed therein terminating at an end wall of said cylinder housing, a hollow cylinder bushing made of plastic material, having a bore formed therein, said bushing received into one section of said cylinder housing stepped bore including another section of the same diameter as said bushing bore aligned with said bushing bore; a generally cylindrical elongated plastic piston slidably received in said another section of said stepped bore in said plastic cylinder housing, and said bore in said bushing; a pressure chamber defined by one end of said piston, said cylinder housing endwall, and said another section of said cylinder housing bore, a hydraulic fluid outlet from said pressure chamber extending through said end wall, an axial fixed stop engaging the other end of said piston upon movement of said piston to a retracted position; a spring in said cylinder housing acting on said piston to urge said piston to said retracted position; a push rod, and means for attaching said push rod to the other end of said piston, said bushing having a radial end face at one end advanced into a cylinder housing by said threaded connection, said cylinder housing having a coaxial step recessed in said another bore section adjacent said one section of said cylinder housing stepped bore, said coaxial step forming a first radial wall facing said bushing radial end face, an annular cup seal received in said step, said cup seal having an inner sealing lip fit to said piston and extending axially towards said cylinder housing end wall; said coaxial step being of lesser diameter than said one section of said cylinder housing stepped bore to form a second radial face in said cylinder housing bore axially spaced from said first radial face; a separate annular disc in said cylinder housing adjacent said coaxial step, interposed between said cup seal and said bushing end face of lesser diameter than said one section of said cylinder housing stepped bore but of greater diameter than the diameter of said coaxial step to form an annular clearance space about the outside of said annular disc, said annular disc having a central opening slidably receiving said piston, said bushing end face engaging one side of said annular disc to exert an axial pressure on said annular disc, said cup seal having an outer axially extending portion integral with said lip, said portion of greater axial width than the width of said coaxial step to be compressed by said annular disc by axial pressure exerted by bushing end face on said annular disc; against said first radial face of said coaxial step in said cylinder housing another bore section, an inlet passage extending through said cylinder housing and into said clearance space; at least one radial hydraulic fluid duct formed in said annular disc extending from said central opening to said annular clearance, said piston formed with at least one longitudinal groove recessed into the surface thereof and axially located to allow fluid communication past said cup seal lip between said pressure chamber and said at least one radial hydraulic fluid duct in said annular disc with said piston in said retracted position but moving past said cup seal lip to close communication therebetween upon advance of said piston from said retracted position.

2. A piston-cylinder assembly as claimed in claim 1, wherein said annular disc is formed with a plurality of radially disposed hydraulic fluid ducts comprised of radially extending grooves formed onto at least one radial face of said annular disc.

3. A piston-cylinder assembly as claimed in claim 2 further including a hydraulic fluid supply tank connected to said inlet passage to communicate with said annular space formed between said another section of said stepped bore in said cylinder housing and the outside of said annular disc.

4. A piston-cylinder assembly as claimed in claim 3, wherein said piston includes a main body portion slidably fit in said bushing bore and extending into said another section of said cylinder housing stepped bore, said main body portion formed with a projection extending from said main body into said pressure chamber, said projection having a conically shaped surface, said at least one longitudinal groove formed in the outside surface of said projection and extending into said main body portion to establish a hydraulic connection between said radial hydraulic fluid ducts and said pressure chamber only in said retracted position of said piston away from said pressure chamber.

5. A piston-cylinder assembly as claimed in claim 3 wherein said annular disc is formed with one or more radial grooves on each radial face thereof extending into said annular duct.

6. A piston-cylinder assembly as claimed in claim 1, wherein said outer portion of said cup seal is provided with axially extending protuberances comprising elastic elements engaging said first radial face and compressed by said axial pressure exerted by said end face of said bushing against said annular disc by threaded advance of said bushing into said cylinder housing.

7. A piston-cylinder assembly as claimed in claim 1, wherein on the push rod side end, said hollow cylinder bushing is provided with an integral radially inwardly extending portion comprising said fixed stop engaging said other end of said piston upon return stroking away from said pressure chamber to said retracted position.

8. A piston-cylinder assembly as claimed in claim 1, said piston rod having a radially enlarged ball end, said enlarged ball end piston rod being molded within said other end of said piston.

9. A piston-cylinder assembly as claimed in claim 1, wherein said hydraulic fluid outlet enables a hydraulic connection between said pressure chamber and said hydraulic system, said fluid outlet comprising a pipe having one end extending through said cylinder wall endwall and into said pressure chamber, said pipe flared at the end entering said pressure chamber, said pipe being pinched at the section exiting from said endwall form a bulging of the circumference of said pipe in said exit section, whereby said flaring together with said bulging comprise means for fixing said pipe within said cylinder housing end wall.

10. A piston cylinder assembly as claimed in claim 1 wherein said bushing bore is formed with a recess adjacent said radial end face, and wherein a second cup seal is received in said recess, said second cup seal having a lip fit to said piston, said annular disc separating said first mentioned and second cup seals.

* * * * *